Oct. 14, 1952 — L. E. ALBERTS — 2,614,236
AIRCRAFT CONTROL APPARATUS
Filed Sept. 13, 1947
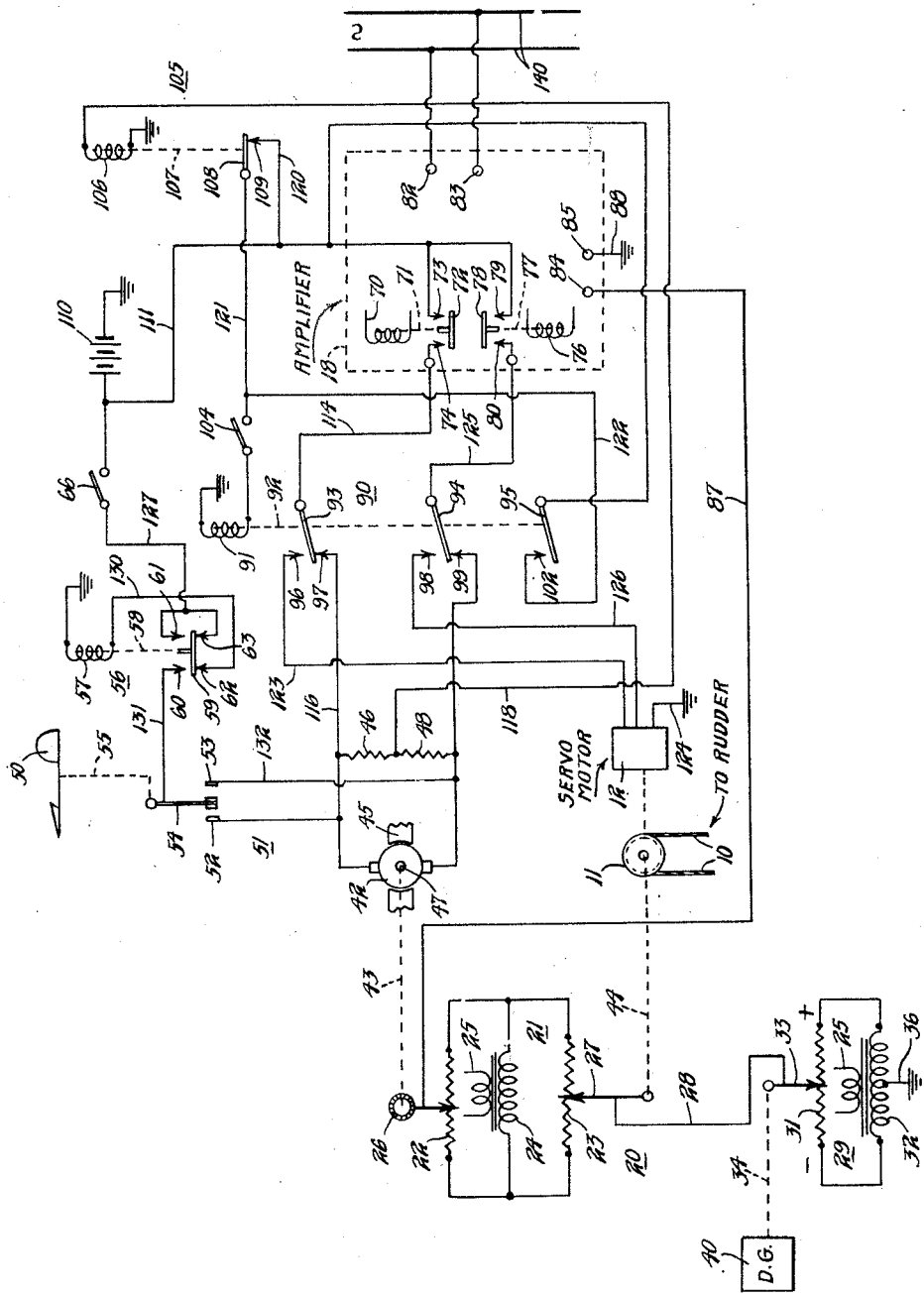
Inventor
LAWRENCE E. ALBERTS
George H. Fisher
Attorney Patented Oct. 14, 1952

2,614,236

UNITED STATES PATENT OFFICE 2,614,236

AIRCRAFT CONTROL APPARATUS

Lawrence E. Alberts, Minneapolis, Minn., assignor to Minneapolis-Honeywell Regulator Company, Minneapolis, Minn., a corporation of Delaware Application September 13, 1947, Serial No. 773,751

9 Claims. (Cl. 318—29)

This invention pertains to improvements in apparatus for automatically controlling an aircraft in flight. The improvements embodied in this invention are for purpose of illustration associated with automatic flight control apparatus of the type disclosed in an application by John F. Schoeppel, No. 567,254, filed December 8, 1944.

In the aforesaid application, a servomotor for operating a rudder of an aircraft is itself controlled through an electronic amplifier whose two input control terminals are connected to a balanceable electric network.

During the time that the automatic flight control apparatus is not utilized to control the aircraft, at which time the servomotor is not operated, the network if unbalanced is rebalanced by the operation of a centering motor.

When the automatic flight control apparatus is being utilized to control the flight of the aircraft, the centering motor is not in use. An object of this invention is to utilize the centering motor when the automatic flight control apparatus is being utilized when the centering motor is normally not in use.

A further object of this invention is to operate the centering motor while the aircraft is under automatic control flight to adjust the network for controlling the servomotor that operates the rudder of the aircraft.

A further object of this invention is to operate the centering motor by means of a circuit that is intermittently completed so that the motor does not continuously vary its adjustment of said network.

A further object of this invention is to include in the circuit operating the centering motor, circuit closing means which are connected to structure responsive to a condition of yaw of the aircraft. The condition of yaw exists when the aircraft is not heading in the direction in which it is moving relative to the air in which it moves.

Further objects of this invention may become apparent from a consideration of the following description and the drawing disclosing one embodiment of said invention.

With reference to the drawing, apparatus is shown therein for controlling only a rudder for an aircraft. While this apparatus would normally form part of a complete flight control system controlling the ailerons and the elevator as well as the rudder, only the control equipment for the latter has been shown in order to simplify the disclosure. In the apparatus illustrated, a rudder (not shown) which controls the aircraft about the turn axis is operated by cables 10 extending from a servomotor cable drum 11. The cable drum 11 is driven by a servomotor 12 which is controlled by an amplifier 18. The amplifier 18 is controlled by a balanceable network 20. The conditions, i. e. whether normal or operative, in which the network 20 is balanced is determined by the position of a directional gyro 40, a follow up member 44 from the servomotor 12, and the centering motor 42 mentioned previously. The two conditions stated will become apparent from the subsequent description of the apparatus.

The rudder servomotor 12 and amplifier 18 may be of any suitable type in whhich the direction of rotation of the servomotor depends upon the phase relation of the voltage across the signal input terminals and the voltage across the line terminals of the amplifier such for example as the type disclosed in application 447,989 of Willis H. Gille.

As disclosed in the aforesaid application of Willis H. Gille, amplifier 18 may reversibly control the servomotor 12 through the operation of two motor control relays. One relay comprises a coil 70 having a plunger 71 which carries in insulated relation a contact engaging bar 72. Coacting with bar 72 are two spaced contacts 73 and 74. The other motor control relay includes a coil 76 having a plunger 77 which carries in insulated relation a contact bar 78. The contact bar 78 coacts with two spaced contacts 79 and 80. As illustrated in the drawing, the contact bars are normally separated from their respective contacts. The amplifier is provided with line voltage input terminals 82, 83 which are connected to a line 140 supplied by a source of alternating voltage, not shown, but which may be the inverter of the conventional aircraft. The amplifier 18 is also provided with control signal input terminals 84, 85. One or the other of the amplifier relay coils 70, 76 is energized dependent upon the phase relationship between the voltage across the line terminals 82, 83 and that across the signal input terminals 84, 85.

An amplifier control signal input circuit extends from terminal 84, lead 87, centering motor and servo balance network 21, lead 28, a directional gyro network 29, lead 36, to ground, to grounded lead 88, and thence to terminal 85. The centering motor and servo balance network 21 comprises a resistor 22 and a resistor 23 connected in parallel across the terminals of a secondary winding 24 having a primary winding 25. A wiper 26 may be adjusted along the surface of resistor 22 either manually or through an operative connection 43 from the centering motor 42. The wiper 27 may be adjusted along resistor 23 by a follow-up connection 44 from the cable drum 11.

The directional gyro network 29 comprises a resistor 31 connected across the terminals of a center tapped secondary winding 32 of a transformer having a primary winding 25. Since a single primary winding may supply several secondary windings, the primary windings of the respective networks 21, 29 are indicated by the same reference character. A wiper 33 may be adjusted along the surface of resistor 31 by an operative connection 34 extending from a directional gyro 40. Wiper 33 constitutes an operation initiation member in a manner to be described. The directional gyro 40 may be of the type well known in the art in which the rotor thereof is mounted for rotation about a horizontal axis. With the above type of directional gyro when the aircraft deviates from a desired heading the wiper 33 partakes of a relative movement with respect to its resistor 31 whereby deviations of the aircraft are sensed.

The centering motor 42 may be of a direct current type having an armature 47 across which is connected a center tapped resistor 48. The motor field 45 of the centering motor 42 may be of the permanent magnet type. The centering motor 42 in one type of operation of the control system is controlled by a vane 50; in another type of operation, the centering motor is controlled by amplifier 18.

A vane operated single pole double throw switch 51, comprising spaced contacts 52, 53 with which coacts the single blade 54, controls the centering motor 42. The switch blade 54 is actuated by a vane 50 through a suitable operating connection 55.

A pulsing relay 56 which also controls the centering motor comprises a coil 57 having a plunger 58 which insulatedly carries a contact bar 59. The bar 59 coacts with out contacts 62, 63 on the one hand and with in contacts 60, 61 on the other hand. The coil 57 of the pulsing relay is controlled by a manually operable single pole single throw pulsing relay switch 66.

An autopilot engage and disengage relay 90 comprises a coil 91 whose plunger 92 actuates switch arms 93, 94, and 95. The switch arm 93 coacts with a servomotor right rotation contact 96 and a centering motor left rotation contact 97. The switch arm 94 coacts with a servomotor left rotation contact 98 and a centering motor right rotation contact 99. The switch arm 95 coacts with a single contact 102 which is designated the autopilot engage relay holding contact. The autopilot engage and disenage relay 90 is controlled by a manually operable single pole single throw engaging switch 104. When the relay is energized to raise switch arms 93, 94, 95, the aircraft is under automatic flight control.

An autopilot anti-engage relay 105 comprises a coil 106 having a plunger 107 which carries in insulated relation a switch arm 108. The switch arm 108 coacts with a single anti-engage contact 109.

Operation

Before the autopilot apparatus is engaged so that it may actuate the control surface, the plane may be manually controlled by conventional means. The manually operable engaging switch 104 and the manually operable pulsing relay switch 66 are in open position as shown. At this time, the contact bar 59 of the pulsing relay is in the lower position as shown, and the switch arms 93, 94 and 95 of the engage and disengage relay 90 are also in the lower position as illustrated.

In the amplifier input circuit, the centering motor operated wiper 26 of the centering motor potentiometer is at the electrical center of resistor 22 if the plane is on the desired heading. Similarly the servomotor operated wiper 27 of the servo balance potentiometer is at the electrical center of resistor 23. At this time therefore there is no difference of potential between the wipers 26 and 27.

Similarly, with the plane on the desired heading, the directional gyro operated wiper 33 is at the electrical center of resistor 31 of the directional gyro potentiometer 30. At this time also there is no difference of potential between wipers 33 and lead 36 connected to the center tap of secondary winding 32. Since the respective networks 21 and 29 of the input circuit of amplifier 18 are in balanced condition the input circuit to the amplifier is in balanced condition at which time the amplifier 18 does not operate.

If the aircraft while under manual control deviates to the left for example from its desired heading, the directional gyro 40 through its operative connection 34 will move wiper 33 to the right whereby wiper 33, in the half cycle under consideration, when the right end of secondary winding 32 is positive with respect to the left end, moves toward the positive end of the resistor 31 as indicated. At this time, the wiper 33 is positive with respect to lead 36. The positive potential on wiper 33 is applied through lead 28, network 21, and lead 87 to terminal 84 of amplifier 18. Similarly the potential of lead 36 is applied through the ground connections and lead 88 to terminal 85 of amplifier 18. Terminal 84 of amplifier 18 is therefore positive with respect to terminal 85. In the half cycle under consideration, the voltage between terminals 84 and 85 of amplifier 18 may be said to be in phase with the voltage across line terminals 82 and 83 of amplifier 18. With the control signal voltage in phase with voltage across the line terminals the coil 70 is energized to raise its plunger 71 to thereby engage bar 72 with conacts 73, 74.

A circuit is now completed from battery 110, lead 111, contact 73, contact bar 72, contact 74, lead 114, switch arm 93, centering motor left rotation contact 97, lead 116, centering motor armature 47, resistor 48, lead 118, anti-engage relay coil 106, to ground, and to the grounded side of battery 110, this circuit causing energization of both centering motor 42 and anti-engaging relay coil 106.

The centering motor 42 now operates to move wiper 26 to the left until the voltage between wipers 26 and 27 is equal but opposite to the voltage between wiper 33 and lead 36. These equal and opposite voltages neutralize one another and the input circuit to amplifier 18 becomes balanced at which time the coil 70 in amplifier 18 is deenergized. The circuit through centering motor 42 and coil 106 is thereby opened.

When the anti-engaging relay coil 106 is energized it raises its plunger 107 to disengage switch arm 108 from the autopilot engage contact 109 thereby preventing initial closing of the circuit through coil 91 and operation of the engaging relay 90. It is thus seen that when the autopilot is disengaged but the input circuit to amplifier 18 is in unbalanced condition which causes the operation of centering motor 42 that the anti-engaging coil 106 is energized thereby preventing the operation of the autopilot engaging relay 90 and the introduction of automatically controlled flight. Motor 42 functions to position its potentiometer wiper so that the network is maintained in balanced condition in the manner disclosed in the aforesaid application 567,254. When the input circuit of amplifier 18 is in balanced condition, the anti-engaging relay 106 is deenergized. At this time the autopilot may be engaged to control the flight of the aircraft.

If it be desired to control the aircraft through the automatic flight control apparatus, the manually operable single throw engaging switch 104 is moved from its open position shown to its closed position. Due to the action of centering motion 42, the amplifier input circuit will presumably be in balanced condition, at which time the switch arm 108 of the anti-engaging relay is in lowered position shown, so that a circuit is completed from battery 110, lead 111, lead 120, engaging contact 109, switch arm 108, lead 121, single throw switch 104, engaging relay coil 91, to ground, and to the grounded side of battery 110. The coil 91 of the engaging and disengaging relay 90 is energized and raises its plunger 92 thereby bringing switch arms 93, 94 and 95 into engagement with contacts 96, 98 and 102 respectively.

When flying on autopilot, the switch 66 is also closed to complete a circuit from battery 110, switch 66, lead 127, contact 63, contact bar 59, contact 62, lead 130, coil 57, to ground and to battery 110. Relay coil 57 begins to pulse since it raises its plunger 58 and contact bar 59 to break its own circuit and permit plunger 58 and bar 59 to return.

If the input circuit to amplifier 18 be in balanced condition as stated neither relay coil 70 nor 76 will be energized and the servomotor 12 which may be controlled by these relays when relay 90 is energized will remain unoperated. If the aircraft should deviate to the left from its heading attained when relay 90 was energized the directional gyro 40 through operative connection 34 moves the wiper 33 of the directional gyro potentiometer to the right. In the half cycle under consideration, the wiper 33 will be moved toward the right end of resistor 31 and its potential will be positive with respect to lead 36 consequently, a positive signal is applied between amplifier terminals 84 and 85. This positive potential during the half cycle considered is in phase with the voltage across terminals 82 and 83 of amplifier 18. Amplifier 18 operates and energizes coil 70 when an in phase signal is applied. Coil 70 raises the contact bar 72 into engagement with spaced contact 73, 74 to complete a circuit extending from battery 110, lead 111, contact 73, contact bar 72, contact 74, lead 114, switch arm 93, servomotor right rotation contact 96, lead 123, servomotor 12, lead 124, to ground, and to the grounded side of battery 110.

The servomotor 12 operates and through cables 10 displaces the rudder of the aircraft toward the right whereby the aircraft is moved toward the right from its leftward deviation. At the same time the servomotor 12, through operative connection 44, moves the wiper 27 of the servo balance potentiometer to the right from its electrical center on resistor 23. This movement of the wiper 27 and of the rudder continues until the potential between wiper 26 and wiper 27 is equal and opposite to the voltage between wiper 33 and lead 36. When these opposed equal voltages exist in the input circuit to amplifier 18, the amplifier no longer operates and bar 72 of relay 70 is separated from contacts 73, 74 thereby opening the circuit of servomotor 12.

The aircraft moves under the applied right rudder toward its desired heading. As the movement of the aircraft toward its desired heading continues, the magnitude of the deviation signal which is reflected in the movement of wiper 33 now decreases and the wiper 33 is moved toward the center of resistor 31. The decreasing positive signal from the directional gyro potentiometer results in the potential between wiper 33 and lead 36 being less than the potential between wiper 26 and wiper 27 consequently a negative signal appears across terminals 84 and 85 of amplifier 18 which is out of phase in the half cycle under consideration with the voltage between line terminals 82 and 83 of amplifier 18. The coil 76 of the other amplifier relay is now energized thereby moving plunger 77 and bringing contact bar 78 into engagement with contacts 79 and 80. Such movement of the contact bar 78 completes a circuit from battery 110, lead 111, contact 79, contact bar 78, contact 80, lead 125, switch arm 94, servomotor left rotation contact 98, lead 126, through servomotor 12, lead 124, to ground, and to the grounded side of battery 110. The servomotor 12 again operates but in a reverse direction thereby moving the rudder toward the normal position from its right position and moves, through follow-up connection 44, wiper 27 toward the center from its right position until the input circuit to amplifier 18 is again balanced.

With the amplifier input circuit in balanced condition, the relay coil 76 is deenergized and plunger 77 with contact bar 78 moves upward in the figure disengaging the bar 78 from contacts 79 and 80. The circuit through servomotor 12 is thereby opened and servomotor 12 no longer positions the rudder and the wiper 27 of the servo balance potentiometer.

The action is continuous. As the wiper 33 is moved toward the center from its right position by the decrease in the directional gyro deviation signal, the servomotor is energized through amplifier relay coil 76 to move the rudder toward the center position and the wiper 27 of the servo balance potentiometer to the left from its right position. When the plane regains its desired heading, the wiper 33 of the directional gyro potentiometer is at the position on resistor 31 that it had assumed when the relay 90 was energized, the wiper 27 of the servo balance potentiometer is at the electrical center of resistor 23, and the rudder is in center position. Neither of the amplifier relay coils 70 nor 76 are energized at this time.

The operation of this system will be considered when the airplane is automatically controlled in flight but when the aircraft assumes a yawed condition. For the purpose of discussion it is assumed that the apparatus is mounted in a multi-engined aircraft although the apparatus functions equally as well in single motored aircraft.

Assume that the motors mounted in the right wing of the aircraft develop greater power than those mounted in the left wing of the aircraft. This condition is an example of unsymmetrical power. The greater power on the right wing causes the aircraft to turn toward the left from its desired direction of heading. The directional gyro will sense the deviation to the left of the aircraft and through operative connection 34 will move the wiper 33 of the directional gyro potentiometer to the right from its center on resistor 31 to initiate an operation of the servomotor 12. The wiper 33 of the directional gyro potentiometer is now positive with respect to lead 36, and it is apparent that a positive signal will be applied between terminals 84 and 85 of amplifier 18 which in this half cycle being considered is in phase with the voltage across terminals 82, 83 of amplifier 18.

Since the plane is being controlled under automatic flight, the engaging relay coil 91 will have been energized by the closure of engaging switch 104. With the signal voltage in phase with that of the line voltage between terminals 82 and 83, the relay coil 70 of one amplifier relay is energized. As described previously a circuit is now completed through the amplifier contacts 73, 72, 74 to the servomotor 12 which operates to position the rudder to the right and at the same time moves the wiper 27 of the servo balance potentiometer to the right from its center position on resistor 23. The movement of wiper 27 continues until the voltage between wiper 26 and wiper 27 is equal and opposite to that between wiper 33 and lead 36 at which time the input circuit to the amplifier 18 is balanced. With the amplifier input circuit in balanced condition, the relay coil 70 is deenergized and the plunger 71 along with contact bar 72 moves downward in the figure to thereby disengage bar 72 from contacts 73, 74.

The aircraft moves under the applied right rudder toward the desired heading of the aircraft. As previously described, as the aircraft moves toward the desired heading, the deviation signal as reflected in the displacement of the wiper 33 of the directional gyro potentiometer decreases and wiper 33 is moved toward the center. This decrease in the deviation signal also results in the servomotor 12 moving its rudder toward the center position and also moves wiper 27 to the left from its right position on resistor 23.

As the plane approaches the desired heading under the continually decreasing right rudder, the plane's actual heading with respect to the desired heading ultimately reaches a point whereby any tendency of the rudder to reduce the deviation which also causes the movement of the rudder more to the normal position causes the unsymmetrical condition of power to move the plane off the desired heading. In other words where there is a permanent condition which is to be corrected, the system as thus far described will not regain the original condition which in the present instance is the desired heading upon which the aircraft was originally set. The reason for this is that for any given position of slider 26, there is always a proportional relationship between the position of the rudder and that of the directional gyro operated slider 33. Hence, in order for the rudder to be maintained in a position displaced from neutral, it is necessary for the heading of the aircraft to be displaced from the desired heading. The aircraft therefore flies with its rudder displaced to the right from central position and with its longitudinal axis at an angle to the desired heading. In such condition of flight the directional gyro operated wiper 33 is to the right of the electrical center of resistor 31 and the wiper 27 of the servo balance potentiometer is slightly to the right of the electrical center of resistor 23. The amplifier input circuit is in balanced condition and neither relay coil 70 nor 76 is energized. At this time the aircraft is actually moving at an angle intermediate the original heading of the aircraft and the present heading of the aircraft.

Since the aircraft is not moving in the direction in which it is headed, the aircraft is in a condition of yaw. To remove such condition of yaw, the centering motor 42 will operate under the control of single throw switch 66 which had been operated as stated and the vane 50 which tends to align itself with the direction in which the aircraft is moving. As vane 50 aligns itself with the direction in which the aircraft is moving, in the present case it rotates switch arm 54 to the right to bring its contact into engagement with contact 53 of the single pole double throw switch 51. A circuit had previously been completed on operation of switch 66 from battery 110, single throw switch 66, lead 127, contact 63, contact bar 59, contact 62, lead 130, pulsing relay coil 57, to ground, and to the grounded side of battery 110. Coil 57 when energized raises plunger 58 and contact bar 59 to engage spaced contacts 60, 61 thereby completing a circuit for centering motor 42 from battery 110, switch 66, lead 127, contact 61, contact bar 59, contact 60, lead 131, operated switch arm 54, contact 53, lead 132, armature 47 of centering motor 42, resistor 46, lead 118, coil 106 of the anti-engaging relay, to ground, and to the grounded side of the battery 110. The circuit through centering motor 42 being completed the centering motor 42 through the operative connection 43 moves wiper 26 to the right from its electrical center on resistor 22. Wiper 26 may now be considered positive with respect to wiper 27 in network 21 or it may, if wiper 27 has a considerable displacement, be said to reduce the negative voltage from network 21, consequently a positive signal is applied between terminals 84, 85 of amplifier 18 which again is in phase with the voltage between terminals 82, 83 of amplifier 18. Amplifier relay coil 70 is now energized to complete a circuit through switch arm 93 and servomotor right rotation contact 96 whereby servomotor 12 is energized to move the rudder to the right. At the same time, through the follow-up connection 44, motor 12 moves wiper 27 of the servo balance potentiometer to the right until the input circuit to amplifier 18 is in balanced condition at which time the amplifier 18 ceases to operate. The coil 70 is no longer energized and the contact bar 72 is separated from the coacting spaced contacts 73, 74.

It may be seen that the relay 56 as described is of the pulsing type in that it breaks its own circuit. During the period when its circuit is broken bar 59 engages contacts 60, 61 whereby a yaw signal may control the centering motor. Consequently while the aircraft is in yaw and the vane 50 moves switch arm 54 into engagement with contact 53, the operation of the pulsing relay 56 permits intermittent energization of the centering motor 42. Since motor 42 is intermittently energized, it does not continuously move the wiper 26 of the centering motor potentiometer but its distance of movement within a time interval is controlled by the pulsing relay. The intermittent operation of centering motor 42 reduces the speed with which wiper 26 of the centering potentiometer is adjusted. The motor 42 adjusts the wiper 26 as long as the vane 50 is displaced from the heading of the aircraft due to the effect of the relative air thereon.

The aircraft turns under the added right rudder resulting from the vane signal. As the aircraft moves toward the desired heading, the directional gyro 40 moves its wiper 33 from its right position toward the center of resistor 31. The movement of wiper 33 toward the center from its right position in effect introduces a negative signal in the input circuit of amplifier 18 whereas the movement of wiper 26 to the right due to the yawed condition of the aircraft introduces a positive signal in the input control circuit of amplifier 18. The resulting position of the rudder at any moment is therefore determined by the relative values of these negative and positive signals introduced by the directional gyro and the centering motor. The resulting position of the rudder at any moment thus depends upon the relative movements of wipers 26 and 33. If wiper 26 moves to the right at the same speed as wiper 33 is moved to the left due to the decrease in deviation, then the increase in positive signal due to the movement of wiper 26 will be offset by the decrease in positive signal due to the movement of wiper 33, consequently the rudder will not change its position.

If the relative increase and decrease in the positive signal in the control network of amplifier 18 are equal and should the aircraft under the applied rudder resulting from the initial operation of vane 50 reach the desired heading, the vane 50 and the directional gyro 40 will cease to operate their respective wipers 26 and 33.

The amount of rudder carried at this time by the aircraft may be sufficient to carry it beyond the desired heading which the aircraft is to fly. The directional gyro 40 which senses deviation of the aircraft to the right of the desired heading would move wiper 33 of the directional gyro potentiometer to the left from its center position thereby placing wiper 33 at a negative potential with respect to lead 36. This negative potential from the directional gyro potentiometer is applied by the means of the input circuit to terminals 84 and 85 of amplifier 18. The negative signal in the amplifier input circuit is out of phase with respect to the potential across terminals 82, 83 of amplifier 18. This out-of-phase signal voltage causes the coil 76 to be energized moving contact bar 78 into engagement with contacts 79, 80. The servomotor 12 operates to move the rudder from its right position towards the center position. The servomotor 12 also moves wiper 27 from its right position toward the center of resistor 23 until the input circuit of amplifier 18 is again in balanced condition.

Due to the decrease in the amount of right rudder carried by the aircraft and to the unsymmetrical power delivered by the engines of the aircraft the aircraft will turn toward the left and the desired heading. During this time the vane 50 energizes centering motor 42 whereby wiper 26 will be positioned in one direction or another from its right position depending upon the direction of yaw of the aircraft.

When the plane due to the decreasing right rudder regains its desired heading and should the amount of right rudder carried offset the tendency of the aircraft to turn to the left due to the unsymmetrical power the aircraft flies on the desired heading with the directional gyro 40 indicating no deviation by moving its wiper 33 to the position on resistor 31 assumed when relay 90 was energized. Due to the displacement of wiper 26 which is balanced by the diplaced rudder and wiper 27 the condition of yaw is removed. The plane now flies on its desired heading in an unyawed flight condition.

It is, of course, understood that if the conditions tending to produce yaw are at any time such that the plane yaws to the right, the action of the apparatus will be in the opposite direction to that described. Thus, switch arm 54 will engage contact 52 to complete a circuit causing reverse rotation of centering motor 42, extending from battery 110, pulsing relay 56, switch arm 54, contact 52, armature 47, resistor 48, lead 118, coil 106, to battery 110.

While the aircraft is under automatic control and while it is being returned to its correct heading after deviating from this heading it is desirable that the autopilot be not disengaged until restored to its correct heading. To prevent such disengagement, coil 91 after being energized upon closing of the engage switch 104, has its holding circuit closed. This circuit extends from battery 110, lead 111, switch arm 95, contact 102, lead 122, switch 104, coil 91 to ground and battery 110. Coil 91 will now remain energized even though coil 106 be energized through the centering motor and thereby disengage contact 109 and switch arm 108 which also control coil 91.

It is now apparent that I have provided a novel control apparatus for an aircraft in which a centering motor is utilized to provide two functions. One function is provided at a time when the autopilot is not controlling the rudder of the aircraft at which time the centering motor operates on a balanceable network which may be associated at will with the control surface operating apparatus, to maintain the network in a balanced condition irrespective of the attitude that the plane may take with respect to the turn axis. The other function provided by the motor occurs when the automatic control surface operating apparatus is operatively connected to the rudder of the aircraft. At this time the motor is operated by a yaw condition responsive vane whereby a yaw signal is introduced into the flight control apparatus to cause the aircraft to fly without yaw and on a desired heading.

I therefore claim as my invention:

1. Control apparatus for an aircraft having a control surface comprising: motor means for operating said control surface; a relay having a plurality of movable arms and two sets of contacts; potential responsive means connected to the movable arms of said relay for controlling said motor means through one set of contacts of said relay while it is energized; a plurality of sources of variable voltage connected in series and having two output terminals; means connecting said terminals to supply a control signal to said potential responsive means; automatic means responsive to the deviations of the aircraft about an axis for adjusting one source of voltage; means driven by said motor means for adjusting a second source of voltage; and an electric motor means for adjusting a third source of voltage; vane means operated in accordance with the direction of movement of the aircraft relative to the direction of heading of the aircraft and selectively connectable with said electric motor means; means connecting said electric motor to said potential responsive means through the second set of relay contacts; all whereby when said relay is unenergized said electric motor as controlled by the potential responsive means varies said third voltage source to reduce said control signal potential and while said relay is energized said electric motor means is controlled by said vane to adjust the third source of voltage and cause the operation of the motor means to cause the aircraft to head in the direction of the relative wind.

2. Control apparatus for an aircraft having a control surface comprising: motor means for operating said control surface; potential responsive means for controlling said motor means; control means including a source of variable voltage connected to said potential responsive means, said source of variable voltage having a source of power, two resistors connected in parallel across said source of power, and an adjustable wiper for each resistor said wipers constituting the output connections of said variable voltage source; means operatively connecting one wiper with said motor means; a second motor means operatively connected to the second wiper; circuit means for controlling the second motor means including a pair of spaced contacts, a condition responsive means including an arm engageable with said contacts, and a pulsing relay, whereby said second motor means is intermittently operated upon a change in condition of the aircraft.

3. Apparatus for controlling an aircraft having a control surface comprising: motor means connected to said control surface; potential responsive means for controlling operation of said motor means; control means for said potential responsive means, said control means including a network provided with a source of voltage, two resistors connected in parallel across said source, and an adjustable wiper for each resistor, said wipers constituting the outputs of the control means and connected to said potential responsive means; adjustable means connected to a first wiper; means connecting said motor means to a second wiper; means responsive to the yaw of the aircraft connected to said adjustable means; operable means interposed between said yaw responsive means and said motor means on the one hand and said potential responsive means on the other hand whereby when said operable means is in one position said motor means is connected to said potential responsive means and when said operable means is in a second position said first wiper adjusting means is connected to said potential responsive means, said first wiper adjusting means in one instance being operative in one instance to balance said network or operative in a second instance in responsive to yaw of said craft to unbalance said network.

4. The apparatus of claim 3 wherein the means responsive to the yaw of the aircraft includes a pulsatingly operable means.

5. Control apparatus for a craft having a control surface; a first motor means for operating said control surface; potential responsive means having output connections connected thereto for controlling said first motor means; a rebalanceable network connected to said potential responsive means; deviation responsive means for unbalancing said network; means driven by said motor means for rebalancing said network; means driven by a second motor means for varying the output of said network; means for disconnecting said first motor means from said potential responsive means output connections and connecting said second motor means to said potential responsive means output connections; means responsive to yaw of the craft for controlling said second motor means, all whereby when said first motor means is disconnected from said potential responsive means output connections and said second motor means is connected thereto the latter serves to rebalance said network and when said first motor means is connected to said potential responsive means output connections said network and said control surface are controlled by said condition responsive means and said yaw responsive second motor means.

6. Apparatus for controlling an aircraft having a control surface comprising: motor means adapted to be connected to said control surface; means adapted to respond to the heading of said aircraft; a first controller adjusted by said heading responsive means; a second follow-up controller adjusted by said motor means; normally balanced mechanism including said controllers for controlling said motor means so as to adjust said control surface to maintain a predetermined heading; means for selectively rendering said normally balanced mechanism operable or inoperable to control said motor means; a further motor means for effecting the balance of said mechanism and alternatively controlled by said mechanism including said both controllers; a third controller driven by said further motor means and included in said normally balanced mechanism; and means responsive to the yaw of the aircraft for operating said third controller when said control surface is operated to maintain said predetermined heading.

7. Control apparatus for aircraft comprising: a first motor; an amplifier; control means for said amplifier including a plurality of controllers; operating means extending from said motor to one controller; a second motor; operating means from said second motor to a controller; means responsive to a condition of said craft for operating a third controller; selective means for controlling said first or said second motor from said amplifier; and means responsive to a second condition for additionally controlling said second motor while said amplifier operates said first motor.

8. Control apparatus for an aircraft comprising: motor means for controlling said craft; a balanceable control means including a plurality of controllers; attitude means responsive to movement of said craft for adjusting one controller; means driven by said motor means and connected to a second controller; a third controller; power means for operating said third controller; means for alternatively connecting said motor means or said power means to said control means for operation thereby whereby said power means may adjust its controller at one rate on unbalance of said balanceable control means; and further means for operating said power means to position said third controller at a different rate while said motor means is controlled by said control means.

9. Control apparatus for an aircraft comprising: power means adapted to operate a rudder for controlling said craft heading; a rebalanceable network means including a plurality of controllers; means responsive to a change in heading condition of said craft to operate one controller;

an operating connection from said power means to a second controller; a third controller; motor means for operating said third controller; means for alternatively connecting said network means to said power means to automatically maintain heading or to said motor means during manual operation of said rudder to change heading whereby said network maintains continuous control of either power means or motor means to the balance point of said network; and further means responsive to the departure of craft heading from craft direction of movement for controlling said motor means while said network means controls said power means during automatic heading control and operating said motor means at a different rate than is exercised on said motor means by said network means, to introduce a slow correction in said heading.

LAWRENCE E. ALBERTS.

REFERENCES CITED

The following references are of record in the file of this patent:

UNITED STATES PATENTS

| Number | Name | Date |
|---|---|---|
| 1,485,781 | Ferdon | Mar. 4, 1924 |
| 2,262,173 | Fischer | Nov. 11, 1941 |
| 2,429,642 | Newton | Oct. 28, 1947 |
| 2,453,917 | Isserstedt | Nov. 16, 1948 |
| 2,464,629 | Young | Mar. 15, 1949 |